United States Patent
Jang et al.

(10) Patent No.: US 9,781,436 B2
(45) Date of Patent: Oct. 3, 2017

(54) SYSTEM AND METHOD FOR TRANSMITTING CROSS-SECTIONAL IMAGES OF THREE-DIMENSIONAL OBJECT AND TRANSMITTING APPARATUS FOR EXECUTING THE SAME

(71) Applicant: SAMSUNG SDS CO., LTD., Seoul (KR)

(72) Inventors: Sung-Ho Jang, Seoul (KR); Kwang-Min Choi, Seoul (KR); Sang-Hoon Hang, Seoul (KR); Jae-Young Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/980,992

(22) Filed: Dec. 28, 2015

(65) Prior Publication Data
US 2017/0061602 A1 Mar. 2, 2017

(30) Foreign Application Priority Data
Aug. 25, 2015 (KR) .................. 10-2015-0119505

(51) Int. Cl.
*G06K 9/00* (2006.01)
*H04N 19/17* (2014.01)
(Continued)

(52) U.S. Cl.
CPC ............. *H04N 19/17* (2014.11); *G06T 9/001* (2013.01); *H04N 19/107* (2014.11);
(Continued)

(58) Field of Classification Search
CPC .... G06T 7/004; G06T 7/0022; G06T 2200/04
See application file for complete search history.

(56) References Cited

U.S. PATENT DOCUMENTS 5,321,622 A * 6/1994 Snead ................. B29C 67/0062
345/419
2005/0035962 A1* 2/2005 Ishibashi ................ G09G 3/003
345/419
(Continued)

FOREIGN PATENT DOCUMENTS

KR 10-2007-0090408 A 9/2007
KR 10-2013-0060144 A 6/2013

OTHER PUBLICATIONS

Wikipedia, "Image Differencing," 2017 [online] www.wikipedia.com [downloaded on 2017-01023] downloaded from << url: https://en.wikipedia.org/wiki/Image_differencing >>, 2 pages.*
(Continued)

*Primary Examiner* — David F Dunphy
(74) *Attorney, Agent, or Firm* — Sughrue Mion, PLLC

(57) ABSTRACT

Provided are a system and method for transmitting cross-sectional images of a three-dimensional (3D) object and a transmitting apparatus for executing the same. A system for transmitting cross-sectional images of a 3D object includes a transmitting apparatus configured to search for a changed region between cross-sectional images of adjacent layers among a plurality of cross-sectional images generated by slicing the 3D object in a horizontal direction, and compress the cross-sectional images using information about the changed region and a receiving apparatus configured to receive the compressed cross-sectional images from the transmitting apparatus and restore the compressed cross-sectional images using the information about the changed region and cross-sectional image information of a layer lower than the layers desired to be restored.

17 Claims, 11 Drawing Sheets

(51) Int. Cl.
  *G06T 9/00* (2006.01)
  *H04N 19/46* (2014.01)
  *H04N 19/593* (2014.01)
  *H04N 19/107* (2014.01)
  *H04N 19/137* (2014.01)
  *H04N 19/182* (2014.01)

(52) U.S. Cl.
  CPC ......... *H04N 19/137* (2014.11); *H04N 19/182* (2014.11); *H04N 19/46* (2014.11); *H04N 19/593* (2014.11)

(56) References Cited

U.S. PATENT DOCUMENTS

| | | | |
|---|---|---|---|
| 2008/0310762 A1* | 12/2008 | Lee | H04N 13/0066 382/305 |
| 2009/0129643 A1* | 5/2009 | Natanzon | G06F 19/321 382/128 |
| 2010/0128998 A1* | 5/2010 | Wegener | G06T 9/00 382/248 |
| 2015/0269290 A1* | 9/2015 | Nelaturi | G06F 17/5009 703/6 |
| 2015/0288976 A1* | 10/2015 | Hendry | H04N 19/70 375/240.12 |
| 2016/0347004 A1* | 12/2016 | Chou | B29C 67/0088 |

OTHER PUBLICATIONS

Communication issued Nov. 21, 2016, issued by the Korean Intellectual Property Office in counterpart Korean Patent Application No. 10-2015-0119505.

\* cited by examiner

CROSS-SECTIONAL
IMAGE OF 25TH LAYER

CROSS-SECTIONAL
IMAGE OF 26TH LAYER

FIG. 6

| Color Info. of Changed Pixel | Number of Skipped Pixels |
|---|---|
| ... | ... |
| Number of Skipped Pixels | Color Info. of Changed Pixel |

FIG. 7

| Number of Skipped Pixels | Start Character | Number of Changed Pixels with Same Color | Color Info. | Number of Changed Pixels with Same Color | Color Info. | ... | Stop Character | Number of Skipped Pixels |

SYSTEM AND METHOD FOR TRANSMITTING CROSS-SECTIONAL IMAGES OF THREE-DIMENSIONAL OBJECT AND TRANSMITTING APPARATUS FOR EXECUTING THE SAME

CROSS-REFERENCE TO RELATED APPLICATION

This application claims priority to and the benefit of Korean Patent Application No. 10-2015-0119505, filed on Aug. 25, 2015, the disclosure of which is incorporated herein by reference in its entirety.

BACKGROUND

1. Field

The present disclosure relates to a technology for efficiently transmitting cross-sectional images of a three-dimensional (3D) object.

2. Discussion of Related Art

In general, a 3D printer performs an operation of outputting a 3D object using two-dimensional (2D) cross-sectional images generated by slicing the 3D object into layers with thickness of the printer's lamination layer. In the case of conventional 3D printing technology, a 3D object is output by generating 2D cross-sectional images in a scalable vector graphics (SVG) format and converting the 2D cross-sectional images into machine language codes such as G-code to controlling the 3D printer. In the case of the SVG format, only the contour lines of the 3D object are expressed, and 3D output is mainly accomplished by having the tool output the layer according to the contour lines using a single color and a single material for layering the output. However, printing technologies such as multi-jet modeling (MJM), color jet, or multi-jet fusion (MUF) that support multi-color and multi-material outputs have recently been applied to 3D printers. These 3D printers generate 2D cross-sectional images in bitmap format which is capable of representing additional information such as color and material as well as contour lines within the image, and such a printer performs an output operation based on the generated 2D cross-sectional images.

However, in the case of the bitmap image, the image resolution is very high, and thus the size of the image data is very large. In addition, the number of cross-sectional images to be stored is also very large because it is inversely proportional to layer thickness of the printer. A large amount of resource for computing, memory, and storage for storing and processing is actually required even for a small size object.

To solve this problem, a scheme of only transmitting a necessary number of cross-sectional images suitable for an output situation of the printer without transmitting all of the generated 2D cross-sectional images to a 3D printer at the same time has recently been used. Even in this streaming-based output operation, a large storage space is still required for storing images, and the size of a cross-sectional image to be streamed is significant, so that problems of transmission delay or error may occur depending on network environment, and thus the risk of an output operation delay and failure is large.

SUMMARY

Exemplary embodiments of the present disclosure are directed to means for reducing storage and network resources required to store and transmit 2D cross-sectional images necessary to output a 3D object.

According to an aspect of the present disclosure, there is provided a system for transmitting cross-sectional images of a 3D object, the system including: a transmitting apparatus configured to search for a changed region between cross-sectional images of adjacent layers among a plurality of cross-sectional images generated by slicing the 3D object in a horizontal direction and compress the cross-sectional images using information about of the changed region; and a receiving apparatus configured to receive the compressed cross-sectional images from the transmitting apparatus and restore the compressed cross-sectional image of the layer to be restored using the information about the changed region and the cross-sectional image information of a layer below the desired layer.

The transmitting apparatus may find the changed region by comparing pixel values of the cross-sectional images of the adjacent layers.

The transmitting apparatus may compress the cross-sectional images by removing the information about the cross-sectional images except the information about the changed region, and the information about the cross-sectional images may include position information and pixel value information of all pixels within the cross-sectional images.

The information about the changed region may include one or more of position information about the changed region, pixel value information about the changed region, pixel value information of successive pixels having the same color in the changed region, and length information of the successive pixels The receiving apparatus may restore a cross-sectional image of a layer adjacent to a lowest layer using cross-sectional image information of a lowest layer of the 3D object that is stored and the information about the changed region and sequentially restore the compressed cross-sectional images using the restored cross-sectional image and the information about the changed region.

According to another aspect of the present disclosure, there is provided a transmitting apparatus including: an image analyzing unit configured to find a changed region between cross-sectional images of adjacent layers among a plurality of cross-sectional images generated by slicing a 3D object in a horizontal direction; an image compressing unit configured to compress the cross-sectional images using information about of the changed region; and an image transmitting unit configured to transmit the compressed cross-sectional images to a receiving apparatus.

The image analyzing unit may find the changed region by comparing pixel values of the cross-sectional images of the adjacent layers.

The image compressing unit may compress the cross-sectional images by removing the information about the cross-sectional images except the information about the changed region, and the information about the cross-sectional images may include position information and pixel value information of all pixels within the cross-sectional images.

The information about the changed region may include one or more of position information about the changed region, pixel value information about the changed region, pixel value information of successive pixels having the same color in the changed region, and length information of the successive pixels.

According to another aspect of the present disclosure, there is provided a method of transmitting cross-sectional images of a 3D object, the method including: searching, by a transmitting apparatus, for a changed region between cross-sectional images of adjacent layers among a plurality of cross-sectional images generated by slicing the 3D object in a horizontal direction; compressing, by the transmitting apparatus, the cross-sectional images using information about of the changed region; receiving, by a receiving apparatus, the compressed cross-sectional images from the transmitting apparatus; and restoring, by the receiving apparatus, the compressed cross-sectional images using the information about the changed region and cross-sectional image information about a layer below the layer to be restored.

The searching of the changed region may include: searching for the changed region by comparing pixel values of the cross-sectional images of the adjacent layers.

The compressing of the cross-sectional images may include: compressing the cross-sectional images by remaining the information about the cross-sectional images except the information about the changed region, and the information about the cross-sectional images may include position information and pixel value information of all pixels within the cross-sectional images.

The information about the changed region may include one or more of position information about the changed region, pixel value information about the changed region, pixel value information of successive pixels having the same color in the changed region, and length information of the successive pixels The restoring of the cross-sectional images may include: restoring a cross-sectional image of a layer adjacent to the lowest layer using cross-sectional image information of the lowest layer of the 3D object which is stored and the information about the changed region, and sequentially restoring compressed cross-sectional images using the restored cross-sectional image and the information about the changed region.

According to another aspect of the present disclosure, there is provided a method of transmitting cross-sectional images of a 3D object, the method including: searching, by an image analyzing unit, a changed region between cross-sectional images of adjacent layers among a plurality of cross-sectional images generated by slicing the 3D object in a horizontal direction; compressing, by an image compressing unit, the cross-sectional images using information about of the changed region; and transmitting, by an image transmitting unit, the compressed cross-sectional images to a receiving apparatus.

The searching of the changed region may include: searching the changed region by comparing pixel values of the cross-sectional images of the adjacent layers.

The compressing of the cross-sectional images may include: compressing the cross-sectional images by removing the information about the cross-sectional images except the information about the changed region, and the information about the cross-sectional images may include position information and pixel value information of all pixels within the cross-sectional images.

The information about the changed region may include one or more of position information about the changed region, pixel value information about the changed region, pixel value information of successive pixels having the same color in the changed region, and length information of the successive pixels.

According to another aspect of the present disclosure, there is provided a computer program coupled to hardware and stored in a recording medium for executing: an image analyzing unit configured to search for a changed region between cross-sectional images of adjacent layers among a plurality of cross-sectional images generated by slicing a 3D object in a horizontal direction; an image compressing unit configured to compress the cross-sectional images using information about of the changed region; and an image transmitting unit configured to transmit the compressed cross-sectional images to a receiving apparatus.

According to the aspects of the present disclosure, cross-sectional images may be effectively compressed by finding a changed region between cross-sectional images of adjacent layers and selectively storing only information about a changed region, unlike an existing scheme of storing all 2D cross-sectional images to be used for an output of a 3D object. That is, an unnecessary waste of storage resources may be reduced by removing redundant data between cross-sectional images and storing only information about a changed region.

Also, according to the aspects of the present disclosure, the network load between a computing apparatus such as a host terminal or server and a 3D output apparatus for performing an output operation may be reduced by transmitting only information about a changed region between cross-sectional images of adjacent layers and restoring a cross-sectional image of a layer desired to be output using cross-sectional image information of a previous layer on a receiving side unlike an existing scheme of transmitting and outputting all cross-sectional images.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 6 is an exemplary diagram illustrating information about a changed region according to a second exemplary embodiment of the present disclosure;

FIG. 7 is an exemplary diagram illustrating information about a changed region according to a third exemplary embodiment of the present disclosure;

DETAILED DESCRIPTION OF EXEMPLARY EMBODIMENTS

Exemplary embodiments of the present disclosure will be described in detail below with reference to the accompanying drawings. The following detailed description is provided to assist the reader in gaining a comprehensive understanding of the methods, apparatuses and/or systems described herein. However, the present disclosure is not limited thereto.

In the following description, well-known technology related to the exemplary embodiments is not described in detail in order to keep the disclosure clear and concise. Terms used herein have been chosen in consideration of functionality of the exemplary embodiments, and may vary depending on a user's or an operator's intentions, or customs in the art. Therefore, the meanings of terms should be interpreted based on the overall context of the present specification. The terminology used herein to describe embodiments of the disclosure is not intended to limit the scope of the disclosure. The articles "a," "an," and "the" are singular in that they have a single referent, however the use of the singular form in the present document should not preclude the presence of more than one referent. In other words, elements of the disclosure referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, integers, steps, operations, elements, components, and/or groups thereof.

Figure 1:
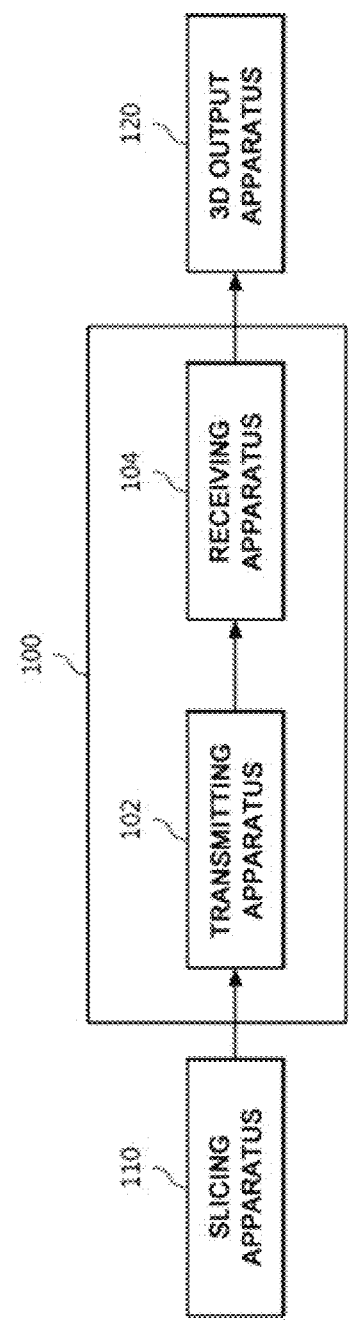
FIG. 1 is a block diagram illustrating a detailed configuration of a system for transmitting cross-sectional images of a 3D object according to an exemplary embodiment of the present disclosure.

FIG. 1 is a block diagram illustrating a detailed configuration of a system 100 for transmitting cross-sectional images of a 3D object according to an exemplary embodiment of the present disclosure. As illustrated in FIG. 1, the cross-sectional image transmitting system 100 includes a transmitting apparatus 102 and a receiving apparatus 104, and may be connected to a slicing apparatus 110 and a 3D output apparatus 120 through a network.

As an apparatus for generating 2D cross-sectional images to be used to output a 3D object, the slicing apparatus 110 may be connected to the transmitting apparatus 102. The slicing apparatus 110 may generate 2D cross-sectional images, that is, a plurality of layer-specific images, by slicing the 3D object in a horizontal direction and transmit the generated cross-sectional images to the transmitting apparatus 102. The above-described cross-sectional image, for example, may be created in various image file forms such as SVG, BMP, and JPG. On the other hand, the slicing apparatus 110 and the transmitting apparatus 102 are described as separate apparatuses for convenience of description here, but this is one example and the slicing apparatus 110 is provided as one component of the transmitting apparatus 102. In this case, software for performing the slicing function may be mounted in the transmitting apparatus 102.

As an apparatus for outputting a 3D object, the 3D output apparatus 120, for example, may be a 3D printer. The 3D output apparatus 120 may be connected to the receiving apparatus 104 and receive cross-sectional images from the receiving apparatus 104. The 3D output apparatus 120 may output the 3D object by spraying ink based on the cross-sectional images received from the receiving apparatus 104. On the other hand, the 3D output apparatus 120 and the receiving apparatus 104 are described as separate apparatuses for convenience of description here, but this is one example, and the receiving apparatus 104 is provided as one component of the 3D output apparatus 120. In this case, software for controlling the 3D output apparatus 120 may be mounted in the 3D output apparatus 120.

The transmitting apparatus 102 sequentially receives the cross-sectional images of the 3D object from the slicing apparatus 110, compresses the received cross-sectional images, and transmits the compressed cross-sectional images to the receiving apparatus 104. The transmitting apparatus 102, for example, may be a data processing apparatus such as a desktop computer, a notebook computer, or a tablet personal computer (PC), or may be provided as one component of a cloud server (not illustrated).

First, the transmitting apparatus 102 may sequentially receive cross-sectional images from a lowest layer to a highest layer of the 3D object from the slicing apparatus 110 and find a changed region between cross-sectional images of adjacent layers among the received cross-sectional images. For example, the transmitting apparatus 102 may find a changed region between a cross-sectional image of a first layer and a cross-sectional image of a second layer among the cross-sectional images sequentially received from the slicing apparatus 110, a changed region between the cross-sectional image of the second layer and a cross-sectional image of a third layer, a changed region between the cross-sectional image of the third layer and a cross-sectional image of a fourth layer, etc. Here, the changed region is a region in which a contour, color, or material changes between the cross-sectional images of the adjacent layers. The transmitting apparatus 102 may find the changed region by comparing pixel values of the cross-sectional images of the adjacent layers. The transmitting apparatus 102 may mutually compare pixel values at the same position on the cross-sectional images of the adjacent layers, determine that the corresponding region is the changed region when the pixel values are not the same, and determine that the corresponding region is not the changed region when the pixel values are the same. Here, the transmitting apparatus 102 may mutually compare the pixel values of the cross-sectional images of the adjacent layers according to various scan lines set as vertical, horizontal, and zigzag scans starting from a set initial offset. In addition, the transmitting apparatus 102 may find a contour line within the corresponding cross-sectional images and selectively compare only pixel values of pixels located within a predetermined distance (a pixel length of 5) based on the contour line.

Next, the transmitting apparatus 102 may compress the cross-sectional images using information obtained about the changed region. Here, the information about the changed region may include one or more of position information about the changed region, pixel value information about the changed region, pixel value information of successive pixels having the same color in the changed region, and length information of the successive pixels. The transmitting apparatus 102 may compress the cross-sectional images by retaining only the information about the changed region among information about the cross-sectional images and removing the remaining information, wherein the information about the cross-sectional images includes position information and pixel value information of all pixels within the cross-sectional images. As an example, the transmitting apparatus 102 may compress the cross-sectional images by retaining only position information about start and end points of a scan-line-specific changed region and pixel values of the changed region among information about the cross-sectional images and removing remaining information. As another example, the transmitting apparatus 102 may compress the cross-sectional images by retaining only a scan-line-specific omission length and pixel values of the changed region among information about the cross-sectional images and removing remaining information. Here, the scan-line-specific omission length indicates the number of successive pixels which do not change according to each scan line. For example, when the number of successive pixels which do not change among pixels of a first scan line is 10, the omission length may be 10. In addition, when the pixels having the same color are successively located among pixels of the changed region, the transmitting apparatus 102 may compress the cross-sectional images by retaining only a scan-line-specific omission length, a start point indication character, the number of successive pixels having the same color, pixel vales of pixels, and an end point indication character among information about the cross-sectional images, and removing the remaining information. Here, the start point indication character and the end point indication character are identifiers for identifying a section indicating information about repeated pixels. That is, the transmitting apparatus 102 may improve a compression rate of data by representing a repetition length and a repetition color of the pixels with respect to repeated pixels having the same color. Accordingly, for example, assuming that the number of repeated pixels having the same color is 10, a total of 30 bytes may be consumed when the color of each pixel is represented as a pixel value, but only a total of 6 bytes may be consumed when the color of each color is represented as a repetition length and a repetition color. On the other hand, the above-described methods of compressing the cross-sectional images are only examples, and the method of compressing the cross-sectional images is not limited thereto. The transmitting apparatus 102 may compress the cross-sectional images in various methods using information about the above-described changed region.

Next, the transmitting apparatus 102 may store the compressed cross-sectional images and transmit the compressed cross-sectional images to the receiving apparatus 104. According to exemplary embodiments of the present disclosure, the transmitting apparatus 102 may reduce wasting of unnecessary storage resources and significantly reduce an amount of data to be transmitted to the receiving apparatus 104 by finding a changed region between cross-sectional images of adjacent layers and compressing the cross-sectional images using the information about the changed region.

The receiving apparatus 104 receives the compressed cross-sectional images from the transmitting apparatus 102 and restores the compressed cross-sectional images. The receiving apparatus 104, for example, may be a host terminal provided with software for controlling the 3D output apparatus 120. In this case, the receiving apparatus 104 may be connected to the 3D output apparatus 120 through the network. Also, the receiving apparatus 104 may be embedded in the 3D output apparatus 120 as one component of the 3D output apparatus 120. In this case, software to be used to control the 3D output apparatus 120 may be mounted in the 3D output apparatus 120.

First, the receiving apparatus 104 may receive cross-sectional information of the lowest layer of the 3D object from the transmitting apparatus 102. The cross-sectional image of the lowest layer is a cross-sectional image of a layer at the lowest position among the layers generated by slicing the 3D object. The 3D output apparatus 120 first uses the cross-sectional image of the lowest layer when the 3D object is output. Information about the cross-sectional image of the lowest layer may include position information and pixel values of all pixels within the cross-sectional image of the lowest layer. The receiving apparatus 104 may receive and store information about the cross-sectional image of the lowest layer and restore the cross-sectional images compressed using the information about the cross-sectional image of the lowest layer and the information about the changed region.

Specifically, every time a cross-sectional image is received, the receiving apparatus 104 may sequentially receive the cross-sectional images compressed by the transmitting apparatus 102 from the transmitting apparatus 102 and restore the received cross-sectional image into a cross-sectional image before compression, that is, an original cross-sectional image. The receiving apparatus 104 may restore a cross-sectional image (second cross-sectional image) of a layer adjacent to the lowest layer using the cross-sectional image information (first cross-sectional image information) of the lowest layer of the 3D object and the information about the changed region. That is, the receiving apparatus 104 may restore a second cross-sectional image by determining a pixel value using the information about the changed region in the case of a changed pixel in relation to a first cross-sectional image among pixels of a second cross-sectional image and determining a pixel value using cross-sectional image information of the lowest layer of a corresponding position in the case of an unchanged pixel. The second cross-sectional image restored using the above-described scheme may be used to restore a third cross-sectional image adjacent to the second cross-sectional image. The receiving apparatus 104 may restore a third cross-sectional image by determining a pixel value using the information about the changed region in the case of a changed pixel in relation to the second cross-sectional image among pixels of a third cross-sectional image and determining a pixel value using second cross-sectional image information of a corresponding position in the case of an unchanged pixel. As described above, the receiving apparatus 104 may restore a cross-sectional image of a layer adjacent to the lowest layer using the cross-sectional image information of the lowest layer of the 3D object and the information about the changed region and sequentially restore the compressed cross-sectional images using the restored cross-sectional image and the information about the changed region.

Also, the receiving apparatus 104 may store the restored cross-sectional images and sequentially transmit the restored cross-sectional images to the 3D output apparatus 120 and the 3D output apparatus 120 may output the 3D object based on the cross-sectional images received from the receiving apparatus 104.

Figure 2:
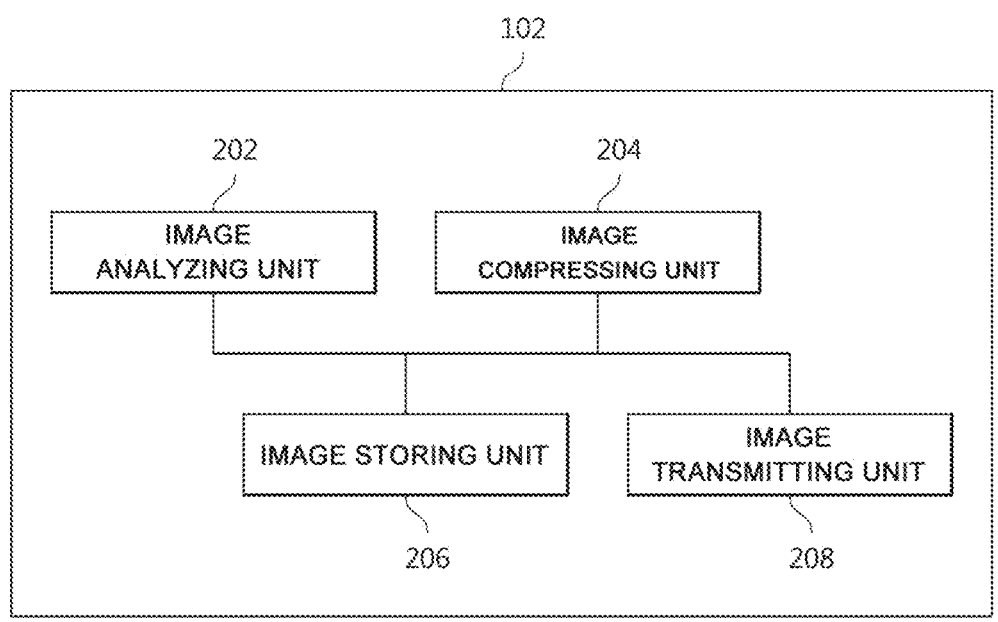
FIG. 2 is a block diagram illustrating a detailed configuration of a transmitting apparatus according to an exemplary embodiment of the present disclosure.

FIG. 2 is a block diagram illustrating a detailed configuration of the transmitting apparatus 102 according to an exemplary embodiment of the present disclosure. As illustrated in FIG. 2, the transmitting apparatus 102 according to the exemplary embodiment of the present disclosure includes an image analyzing unit 202, an image compressing unit 204, an image storing unit 206, and an image transmitting unit 208.

The image analyzing unit 202 finds a changed region between cross-sectional images of adjacent layers among cross-sectional images of 3D objects. As described above, the image analyzing unit 202 may mutually compare pixel values at the same position on the cross-sectional images of the adjacent layers, determine that the corresponding region is the changed region when the pixel values are not the same, and determine that the corresponding region is not the changed region when the pixel values are the same. At this time, the image analyzing unit 202 may mutually compare pixel values of the cross-sectional images of the adjacent layers according to a set scan line starting from a set initial offset.

The image compressing unit 204 compresses the cross-sectional images using information about the changed region. As described above, the information about the changed region may include one or more of position information about the changed region, pixel value information about the changed region, pixel value information of successive pixels having the same color in the changed region, and length information of the successive pixels. The image compressing unit 204 may compress the cross-sectional images by retaining only the information about the changed region among information about the cross-sectional images and removing the remaining information. Thereafter, the image compressing unit 204 may store the compressed cross-sectional images in the image storing unit 206.

As a storage in which the compressed cross-sectional images are stored, the image storing unit 206 may sequentially store the compressed cross-sectional images in the image storing unit 206. The image transmitting unit 208 may sequentially transmit the cross-sectional images stored in the image storing unit 206 to the receiving apparatus 104 in a compressed state.

The image transmitting unit 208 transmits the compressed cross-sectional images to the receiving apparatus 104. The image transmitting unit 208 may sequentially transmit the cross-sectional images compressed in the image compressing unit 204 (or cross-sectional images stored in the image storing unit 206) to the receiving apparatus 104. According to exemplary embodiments of the present disclosure, the transmitting apparatus 102 may reduce wasting of unnecessary storage resources and significantly reduce the amount of data to be transmitted to the receiving apparatus 104 by finding a changed region between cross-sectional images of adjacent layers and compressing the cross-sectional images using the information about the changed region.

In an exemplary embodiment, the image analyzing unit 202, the image compressing unit 204, the image storing unit 206, and the image transmitting unit 208 may be implemented on a computing apparatus including one or more processors and a computer-readable recording medium connected to the processors. The computer-readable recording medium may be located inside or outside the processor and connected to a processor through well-known various means. The processor within the computing apparatus may cause the computing apparatus to operate according to an exemplary embodiment described in this specification. For example, when the commands are executed by the processor, the processor may execute commands stored in the computer-readable recording medium, and the commands stored in the computer-readable recording medium may be configured to cause the computing apparatus to perform operations according to the exemplary embodiment described in this specification.

The above modules of the transmitting apparatus 102 and the receiving apparatus 104 may be implemented with hardware. For example, the transmitting apparatus 102 and the receiving apparatus 104 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the image analyzing unit 202, the image compressing unit 204, the image storing unit 206, and the image transmitting unit 208 of the transmitting apparatus 102 may be implemented as hardware of the above-described computing apparatus.

Figure 3:
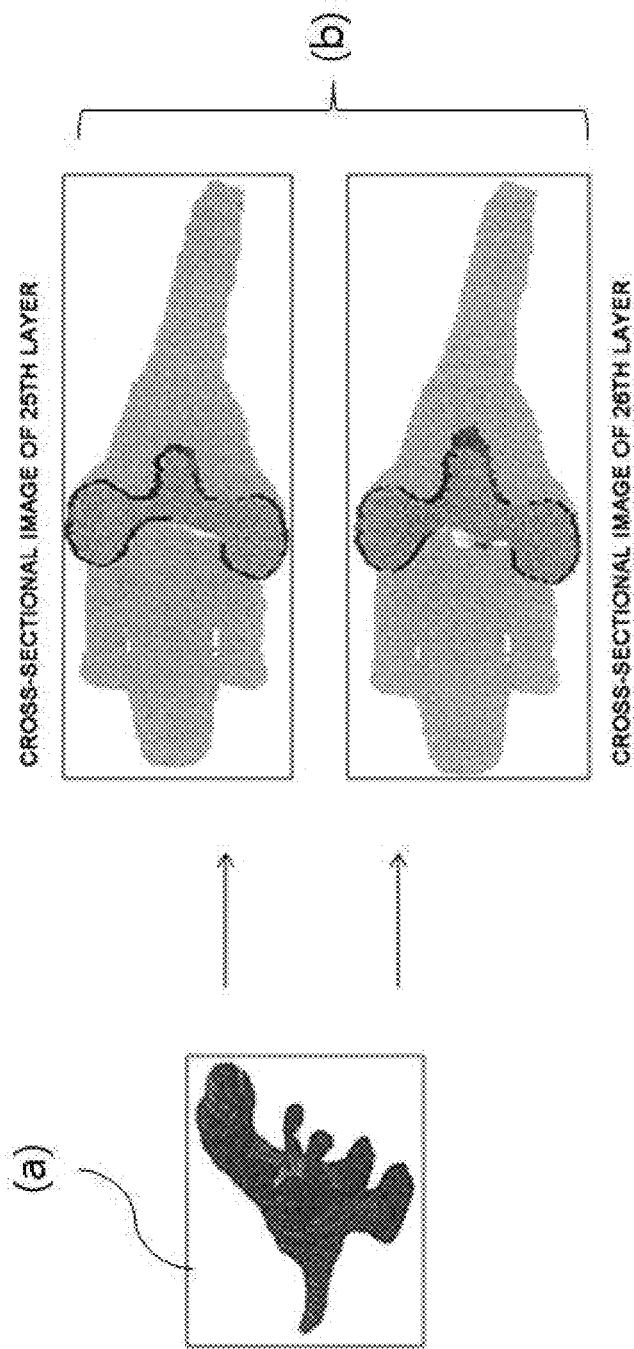
FIG. 3 is an exemplary diagram illustrating cross-sectional images of adjacent layers according to an exemplary embodiment of the present disclosure.

FIG. 3 is an exemplary diagram illustrating cross-sectional images of adjacent layers according to an exemplary embodiment of the present disclosure. (a) of FIG. 3 is an exemplary diagram illustrating a 3D object and (b) of FIG. 3 is an exemplary diagram illustrating a $25^{th}$ cross-sectional image and a $26^{th}$ cross-sectional image of the 3D object. As illustrated in (b) of FIG. 3, it can be seen that there is not a large difference except for some portion. Similarity between the cross-sectional images of the adjacent layers may be higher when the 3D object has a simpler form. For example, in the case of the 3D object having a simple shape such as a cube, a circle, or a triangular pyramid, similarity between the cross-sectional images of the adjacent layers is high, and therefore compression efficiency may significantly increase.

Figure 4A:
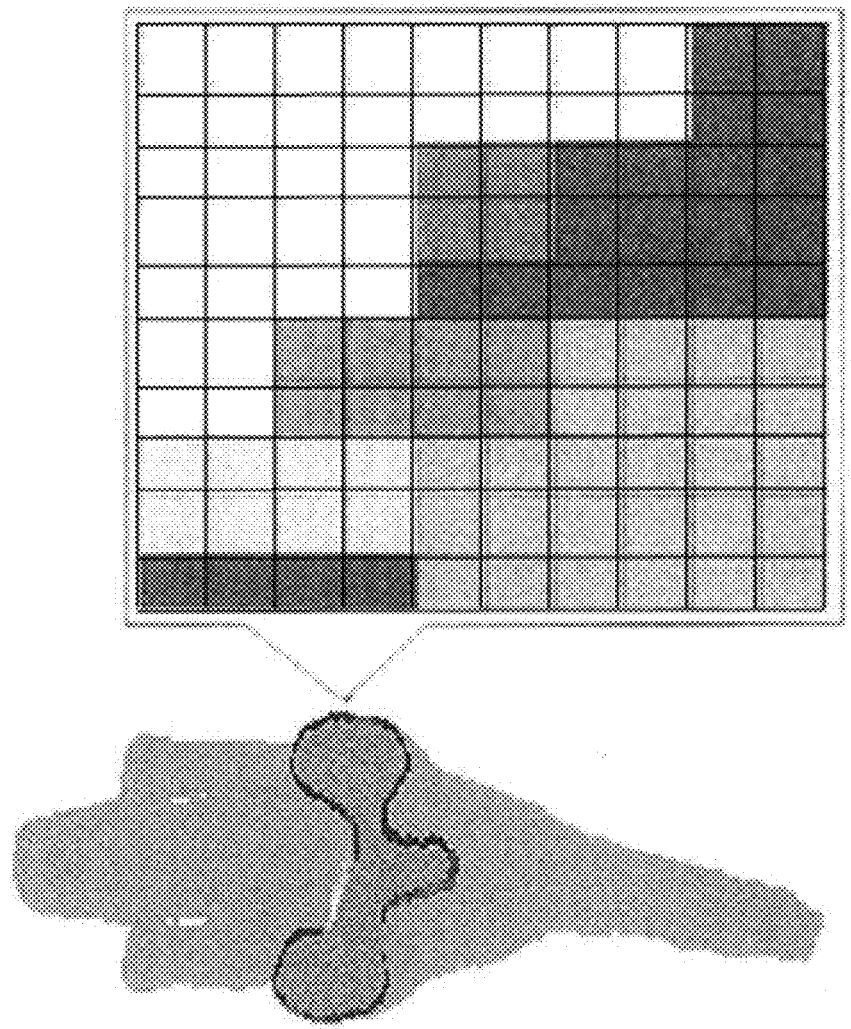
FIGS. 4A and 4B are an explanatory diagrams illustrating a process of searching for a changed region in the transmitting apparatus according to an exemplary embodiment of the present disclosure.
Figure 4B:
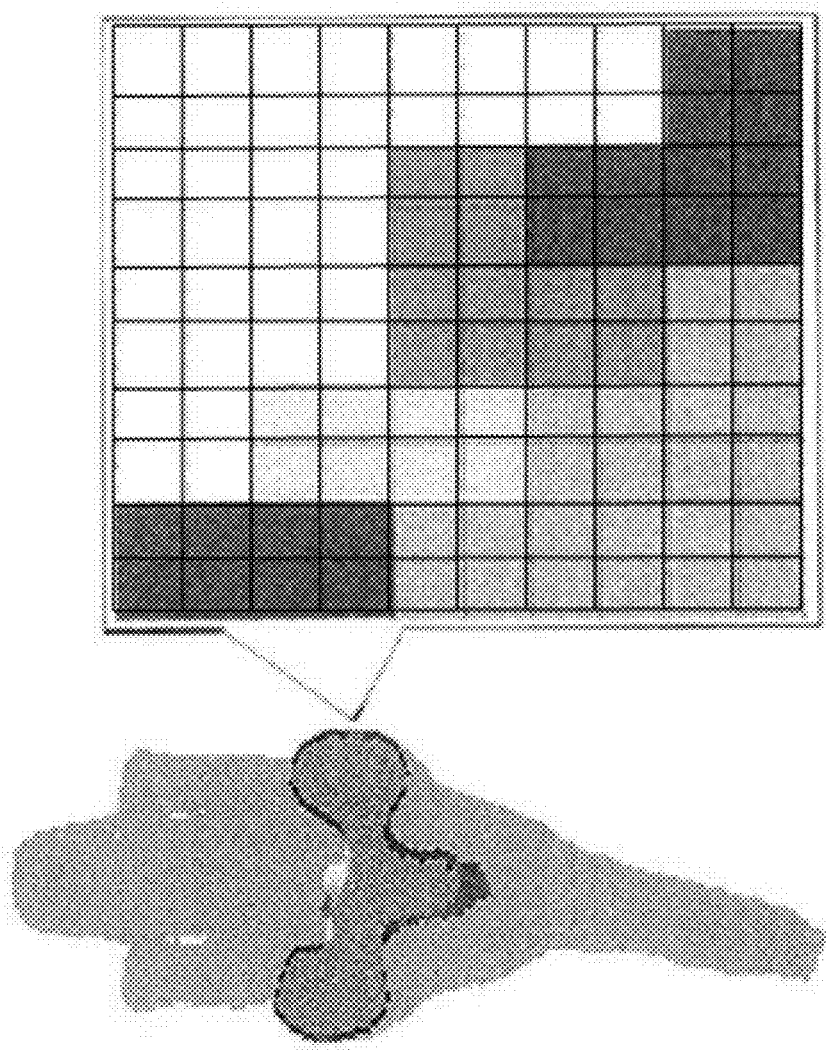

FIGS. 4A and 4B are an explanatory diagrams illustrating a process of searching for a changed region in the transmitting apparatus 102 according to an exemplary embodiment of the present disclosure. FIGS. 4A and 4B illustrate enlargements of the same pixel regions within the $25^{th}$ cross-sectional image and the $26^{th}$ cross-sectional image. As described above, the transmitting apparatus 102 may search for the changed region by comparing the pixel values of the cross-sectional images of the adjacent layers.

Assuming that an upper-left end is (1, 1) and a lower-right end is (10, 10) in two pixel regions, the changed region is (5, 5) to (5, 10), (6, 3) to (6, 8), (7, 3) to (7, 6), (8, 1) to (8, 6), and (9, 1) to (9, 4), and the transmitting apparatus 102 may search for the changed region by comparing the pixel values of the cross-sectional images of the adjacent layers. As described above, the transmitting apparatus 102 may compare the pixel values of the cross-sectional images of the adjacent layers according to various scan lines set as vertical, horizontal, and zigzag scans from a set initial offset. Also, the transmitting apparatus 102 may search for a contour line within the corresponding cross-sectional image and selectively compare only pixel values of pixels located at a given distance (a pixel length of 5).

Figure 5:
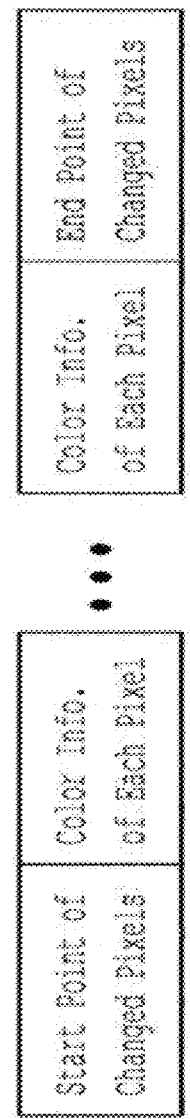
FIG. 5 is an exemplary diagram illustrating information about a changed region according to a first exemplary embodiment of the present disclosure.

FIGS. 5 to 7 are exemplary diagrams illustrating information about a changed region according to exemplary embodiments of the present disclosure.

As illustrated in FIG. 5, the information about the changed region may be information obtained by retaining only position information (start points of changed pixels, end points of changed pixels) about start and end points of a scan-line-specific changed region and pixel values (color information of each pixel) of the changed region among information about the cross-sectional images and removing the remaining information. Here, the information about the cross-sectional images may be position information and pixel value information of all pixels within the cross-sectional images.

Also, as illustrated in FIG. 6, the information about the changed region may be information obtained by retaining only a scan line-specific omission length (number of skipped pixels) and pixel values (color information of each pixel) of the changed region among information about the cross-sectional images, and removing the remaining information. Here, the scan-line-specific omission length indicates the number of successive pixels which does not change according to each scan line. For example, when the number of successive pixels which does not change among pixels of a first scan line is 10, the omission length may be 10.

Also, as illustrated in FIG. 7, when the pixels having the same color are successively located among pixels of the changed region, the information about the changed region may be information obtained by retaining only a scan-line-specific omission length (the number of skipped pixels), a start point indication character (start character), the number of successive pixels having the same color (the number of changed pixels with the same color), pixel values (pixel information) of pixels, and an end point indication character (stop character) among information about the cross-sectional images and removing the remaining information. Here, the start point indication character and the end point indication character are identifiers for identifying a section indicating information about repeated pixels.

As described above, the transmitting apparatus 102 may significantly reduce an amount of data to be transmitted to the receiving apparatus 104 by transmitting only the information about the changed region instead of the information about the cross-sectional images to the receiving apparatus 104.

Figure 8:
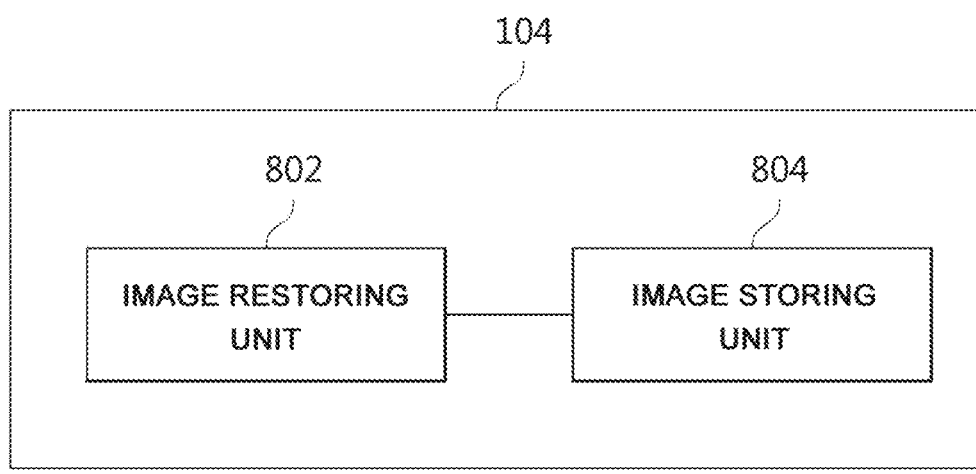
FIG. 8 is a block diagram illustrating a detailed configuration of a receiving apparatus according to an exemplary embodiment of the present disclosure.

FIG. 8 is a block diagram illustrating a detailed configuration of the receiving apparatus 104 according to an exemplary embodiment of the present disclosure. As illustrated in FIG. 8, the receiving apparatus 104 according to the exemplary embodiment includes an image restoring unit 802 and an image storing unit 804.

The image restoring unit 802 receives compressed cross-sectional images from the transmitting apparatus 102 and restores the compressed cross-sectional images using information about a changed region and cross-sectional image information of a layer lower than the layers desired to be restored. As described above, the transmitting apparatus 102 may compress the cross-sectional images by retaining the information about the changed region among information about the cross-sectional images and removing the remaining information and transmit the compressed cross-sectional images to the image restoring unit 802. At this time, the transmitting apparatus 102 may transmit cross-sectional image information of the lowest layer to the image restoring unit 802 along with the compressed cross-sectional images. The image restoring unit 802 may store the cross-sectional image information of the lowest layer in the image storing unit 804. The cross-sectional image information of the lowest layer may include position information and pixel value information of all pixels within the cross-sectional image of the lowest layer.

The image restoring unit 802 restores a cross-sectional image of a layer adjacent to the lowest layer using cross-sectional image information of the lowest layer of the 3D object stored in the image storing unit 804 and the information about the changed region, and sequentially restores the compressed cross-sectional images using the restored cross-sectional image and the information about the changed region.

Specifically, the image restoring unit 802 may restore a second cross-sectional image by determining a pixel value using the information about the changed region in the case of a changed pixel in relation to a first cross-sectional image (a cross-sectional image of a lowest layer) among pixels of a second cross-sectional image (a cross-sectional image of a layer adjacent to the lowest layer) and determining a pixel value using cross-sectional image information of the lowest layer of a corresponding position in the case of an unchanged pixel. Also, the image restoring unit 802 may restore a third cross-sectional image by determining a pixel value using the information about the changed region in the case of a changed pixel in relation to the second cross-sectional image among pixels of the third cross-sectional image and determining a pixel value using second cross-sectional image information of a corresponding position in the case of an unchanged pixel. Through the above-described method, the image restoring unit 802 may sequentially restore cross-sectional images of the remaining layers.

Also, the image restoring unit 802 may sequentially restore the cross-sectional images in the image storing unit 804.

The image storing unit 804 serves as a storage in which the cross-sectional images restored by the image restoring unit 802 are stored and the image restoring unit 802 may sequentially store the cross-sectional image information of the lowest layer and the restored cross-sectional images received from the transmitting apparatus 102 in the image storing unit 804. The cross-sectional images stored in the image storing unit 804 may be automatically deleted when a predetermined time (for example, 2 hours) has elapsed.

Figure 9:
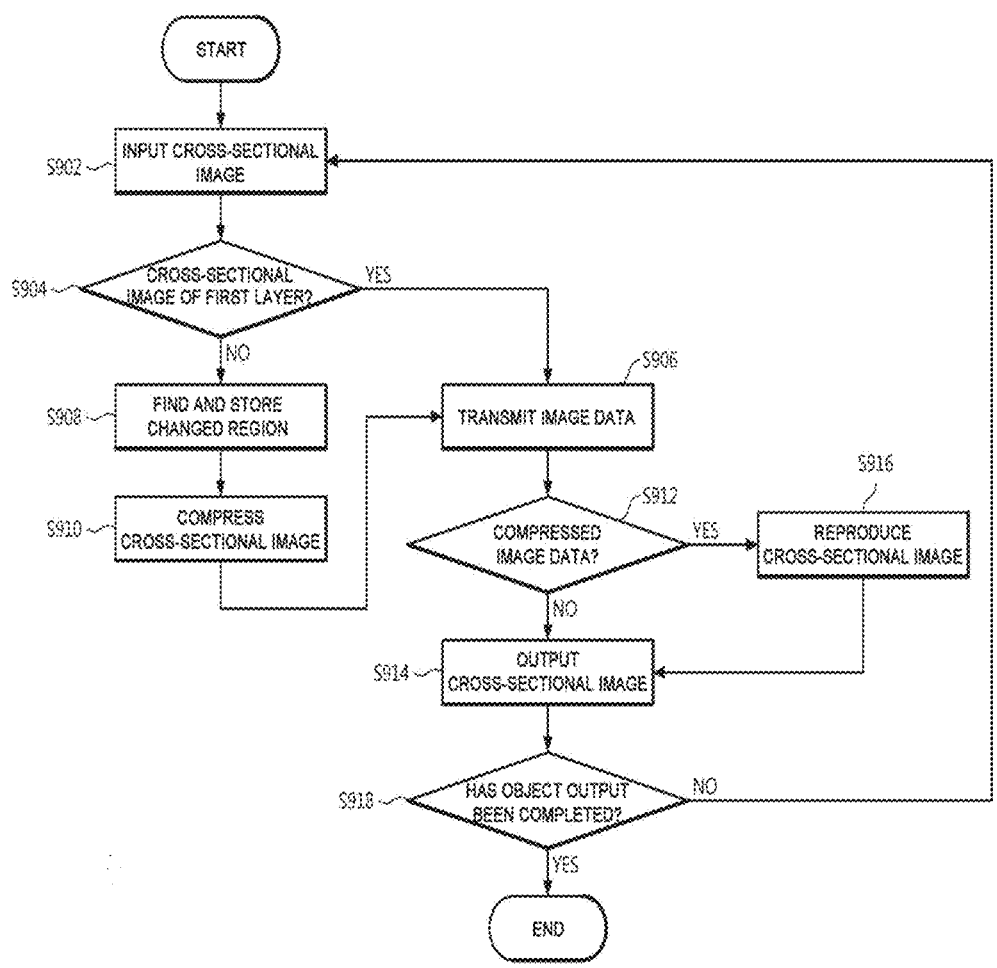
FIG. 9 is a flowchart illustrating a method of transmitting cross-sectional images of a 3D object according to an exemplary embodiment of the present disclosure.

FIG. 9 is a flowchart illustrating a method of transmitting cross-sectional images of a 3D object according to an exemplary embodiment of the present disclosure.

First, the transmitting apparatus 102 sequentially receives cross-sectional images of the 3D object from the slicing apparatus 110 (S902).

Next, the transmitting apparatus 102 determines whether an input cross-sectional image is a cross-sectional image of a first layer (S904).

When the input cross-sectional image is the cross-sectional image of the first layer, the transmitting apparatus 102 transmits the cross-sectional image to the receiving apparatus (S906).

When the input cross-sectional image is not the cross-sectional image of the first layer, the transmitting apparatus 102 finds and stores a changed region by mutually comparing the cross-sectional image with an adjacent cross-sectional image, that is, a cross-sectional image of a lower layer than the layer corresponding to the cross-sectional image (S908). As described above, the transmitting apparatus 102 may find the changed region by comparing pixel values of the cross-sectional images of the adjacent layers.

Next, the transmitting apparatus 102 compresses the cross-sectional images using the information about the changed region (S910). Thereafter, the transmitting apparatus 102 transmits the compressed cross-sectional images to the receiving apparatus 104 (S906).

Next, the receiving apparatus 104 determines which of an original cross-sectional image and a compressed cross-sectional image is data received from the transmitting apparatus 102 (S912).

When the data received from the transmitting apparatus 102 is the original cross-sectional image, the receiving apparatus 104 transmits the original cross-sectional image to the 3D output apparatus 120 and the 3D output apparatus 120 outputs the original cross-sectional image (S914).

When the data received from the transmitting apparatus 102 is the compressed cross-sectional image, the receiving apparatus 104 restores the compressed cross-sectional image using the information about the changed region (S916). Thereafter, the receiving apparatus 104 transmits the restored cross-sectional image to the 3D output apparatus 120 and the 3D output apparatus 120 outputs the cross-sectional image (S914).

Finally, the 3D output apparatus S120 determines whether the output of the 3D object has been completed (S918). The 3D output apparatus 120 may determine whether the output of the 3D object is completed by determining whether the output cross-sectional image is a cross-sectional image of a highest layer of the 3D object. When the output cross-sectional image is not the cross-sectional image of the highest layer of the 3D object, steps S902 to S914 are iterated.

Figure 10:
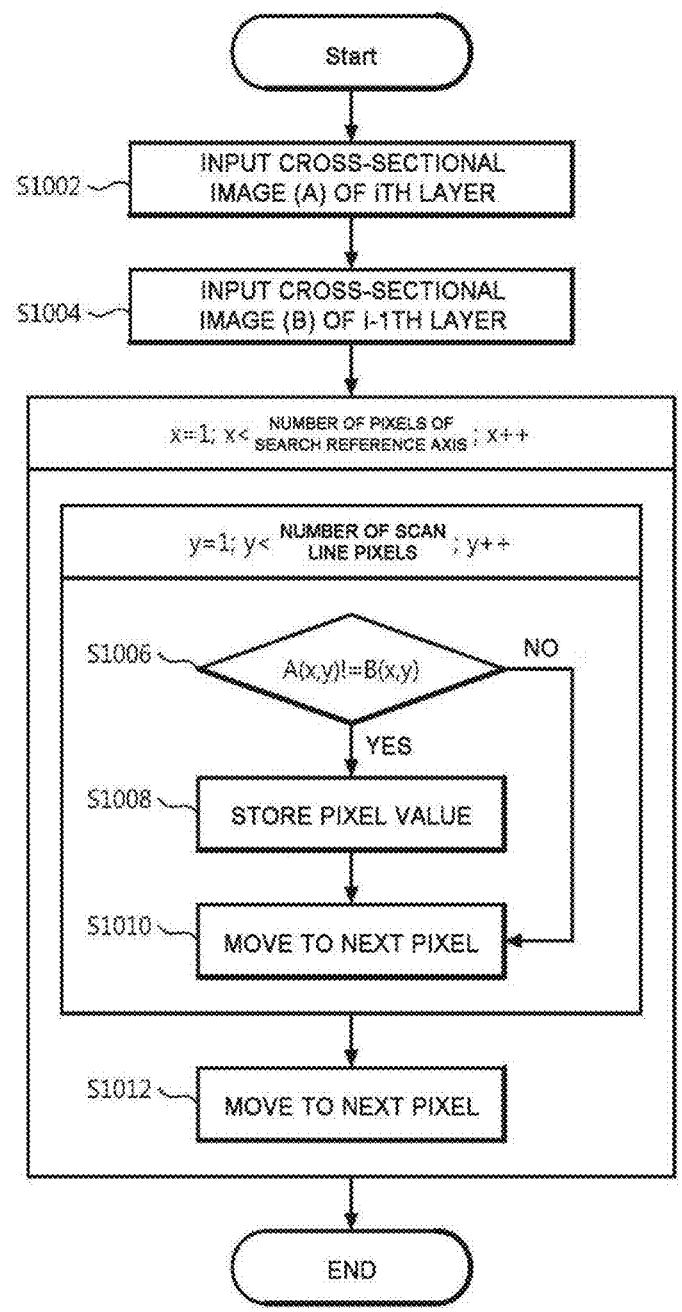
FIG. 10 is a flowchart illustrating step S908 of FIG. 9.

FIG. 10 is a flowchart illustrating step S908 of FIG. 9.

First, when it is determined that the cross-sectional image input in step S904 is not the cross-sectional image of the first layer (that is, when the input cross-sectional image is a compressible cross-sectional image of the layer), the transmitting apparatus 102 receives a cross-sectional image A of the corresponding layer (S1002).

Next, the transmitting apparatus 102 receives a cross-sectional image B of a previous layer necessary in search of the changed region (S1004). Here, the previous layer indicates a lower layer adjacent to the layer to be restored.

Next, the transmitting apparatus 102 mutually compares pixels values of the cross-sectional images A and B of the adjacent layers (S1006). At this time, the transmitting apparatus 102 may compare the pixel values according to a set scan line. The scan line may be an X- or Y-axis line of the cross-sectional images A and B. In steps S1006 to S1010, the transmitting apparatus 102 is assumed to sequentially compare the pixel values in a Y-axis direction for first columns of the cross-sectional images A and B.

When pixel values at the same point (pixel) of the cross-sectional images A and B of the adjacent layers are the same as each other, the transmitting apparatus 102 compares pixel values for the next pixel (S1010).

When pixel values at the same point (pixel) of the cross-sectional images A and B of the adjacent layers are different from each other, the transmitting apparatus 102 stores position information (coordinates) and a pixel value of the corresponding pixel (S1008) and compares pixel values for the next pixel and the next search line (pixel column) (S1010 and S1012).

When the transmitting apparatus 102 completes the comparison of pixel values for the first columns of the cross-sectional images A and B, the transmitting apparatus 102 may iterate the above-described process on the remaining pixel columns, that is, second columns, third columns, fourth columns, . . . of the cross-sectional images A and B.

Meanwhile, exemplary embodiments of the present disclosure may include a program to be executed on a computer and a computer-readable recording medium including the program. The computer-readable recording medium may include a program command, a local data file, and a local data structure individually or in combination. The above-described medium may be a medium specially designed and configured for the present disclosure or already known to and used by those skilled in the art of the computer software field. An example of the computer-readable recording medium includes magnetic media such as a hard disk, a floppy disk, and a magnetic tape, optical media such as a compact disc-read only memory (CD-ROM) and a digital video disc (DVD), a magneto-optical medium such as a floppy disk, and a hardware device specially formed to store and perform a program command, such as a ROM, a random access memory (RAM), and a flash memory. An example of the program command includes a high-level language code that can be executed by a computer using an interpreter as well as a machine language code made by a compiler.

Although the present disclosure has been described through representative exemplary embodiments, it shall be appreciated that various permutations and modifications of the described embodiment are possible by those skilled in the art to which the present disclosure pertains without departing from the scope of the disclosure. Therefore, the scope of the present disclosure shall not be defined by the described embodiment but shall be defined by the appended claims and their equivalents.

What is claimed is:

1. A three-dimensional (3D) printing system comprising:
an image processing apparatus configured to receive a first image of a plurality of cross-sectional images corresponding to a first layer of a 3D object and a second image of the plurality of cross-sectional images corresponding to a second layer of the 3D object, the first layer being adjacent to the second layer, determine a difference region between the first image and the second image, and generate a compressed image corresponding to the second image, the compressed image comprising information indicating the difference region; and
a 3D printing apparatus configured to receive image data corresponding to the first image and the compressed image from the image processing apparatus, and restore the second image using the image data corresponding to the first image and the information indicating the difference region.

2. The system according to claim 1, wherein the image processing apparatus is further configured to determine the difference region by comparing corresponding pixel values of the first image and the second image.

3. The system according to claim 1,
wherein each of the plurality of cross-sectional images comprises position information and pixel value information of pixels associated with the position information of pixels associated with the position information, and
wherein the image processing apparatus is further configured to generate the compressed image by removing position information and pixel value information not corresponding to the difference region.

4. The system according to claim 3, wherein the difference region comprises at least one among position information about the difference region, pixel value information about pixels of the difference region, pixel value information of successive pixels having a same color in the difference region, and length information of the successive pixels.

5. A three-dimensional (3D) processing apparatus comprising:
an image encoder configured to determine a difference region between a first cross-sectional image among a plurality of cross-sectional images of a 3D object and a second cross-sectional image among the plurality of cross-sectional images of the 3D object generated by slicing the 3D object in a planar direction, and generate a compressed image corresponding to the second image, the compressed image comprising information indicating the difference region between the first image and the second image; and an image transmitter configured to transmit image data corresponding to the first image and the compressed image to a 3D printing apparatus.

6. The apparatus according to claim 5, wherein image encoder is further configured to determine the difference region by comparing corresponding pixel values of the first cross-sectional image and the second cross-sectional image.

7. The apparatus according to claim 5, wherein each of the plurality of the cross-sectional images comprises position information and pixel value information of pixels associated with the position information, and wherein the image encoder is further configured to generate the compressed image by removing position information and pixel value information not corresponding to the difference region.

8. The apparatus according to claim 7, wherein the difference region comprises at least one among position information about the difference region, pixel value information about pixels of the difference region, pixel value information of successive pixels having a same color in the difference region, and length information of the successive pixels.

9. An image processing method of processing a plurality of cross-sectional images of a three-dimensional (3D) object generated by slicing the 3D object in a planar direction, the method comprising:

determining, by an image processing apparatus, a difference region between a first image of the plurality of cross-sectional images corresponding to a first layer of the 3D object and a second image of the plurality of cross-sectional images corresponding to a second layer of the 3D object, the first layer being adjacent to the second layer;

generating, by the image processing apparatus, a compressed image corresponding to the second image, the compressed image comprising information indicating the difference region; and transmitting, by the image processing apparatus, the first image and the compressed image to a 3D printing apparatus for the 3D printing apparatus to restore the second image from the compressed image using the image data corresponding to the first image and the information indicating the difference region.

10. The method according to claim 9, wherein the determining the difference region comprises comparing corresponding pixel values of the first image and the second image.

11. The method according to claim 9, wherein each of the plurality of cross-sectional images comprises position information and pixel value information of pixels associated with the position information, and wherein the generating comprises generating the compressed image by removing position information and pixel value information not corresponding to the difference region.

12. The method according to claim 11, wherein the difference region comprises at least one among position information about the difference region, pixel value information corresponding to the difference region, pixel value information of successive pixels having a same color in the difference region, and length information of the successive pixels.

13. A method of transmitting a plurality of cross-sectional images of a three-dimensional (3D) object generated by slicing the 3D object in a planar direction, the method comprising:

determining, by an image encoder, a difference region between a first image of the plurality of cross-sectional images corresponding to a first layer of the 3D object and a second image of the plurality of cross-sectional images corresponding to a second layer of the 3D object, the first layer being adjacent to the second layer;

generating, by the image encoder, a compressed image corresponding to the second image, the compressed image comprising information indicating the difference region; and transmitting, by an image transmission interface, the first image and the compressed image to a 3D printing apparatus.

14. The method according to claim 13, wherein the determining the difference region comprises comparing corresponding pixel values of the first image and the second image.

15. The method according to claim 13, wherein each of the plurality of cross-sectional images comprises position information and pixel value information, and wherein the generating comprises compressing the second image by removing position information and pixel value information not corresponding to the difference region.

16. The method according to claim 15, wherein the difference region comprises at least one among position information about the difference region, pixel value information corresponding to the difference region, pixel value information of successive pixels having a same color in the difference region, and length information of the successive pixels.

17. A non-transitory computer readable medium having embodied thereon a computer program, which when executed by a processor of a three-dimensional (3D) image processing apparatus, causes the 3D image processing apparatus to execute a method of processing 3D images, the method comprising:

determining a difference region between a first image of the plurality of cross-sectional images corresponding to a first layer of the 3D object and a second image of the plurality of cross-sectional images corresponding to a second layer of the 3D object, the first layer being adjacent to the second layer;

generating a compressed image corresponding to the second image, the compressed image comprising information indicating the difference region; and transmitting the first image and the compressed image to a 3D printing apparatus.

* * * * *